(12) United States Patent
Nanda et al.

(10) Patent No.: US 8,074,258 B2
(45) Date of Patent: Dec. 6, 2011

(54) OBTAINING DIGITAL IDENTITIES OR TOKENS THROUGH INDEPENDENT ENDPOINT RESOLUTION

(75) Inventors: Arun K. Nanda, Sammamish, WA (US); Tariq Sharif, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 12/141,515

(22) Filed: Jun. 18, 2008

(65) Prior Publication Data
US 2009/0320095 A1    Dec. 24, 2009

(51) Int. Cl.
*H04L 9/00* (2006.01)
*H04L 9/32* (2006.01)
(52) U.S. Cl. .................... 726/1; 726/2; 726/3
(58) Field of Classification Search ............... 713/150, 713/155–156, 159, 165, 167, 189, 192–194; 726/1–5, 17–21, 9–10
See application file for complete search history.

(56) References Cited

U.S. PATENT DOCUMENTS

| | | | |
|---|---|---|---|
| 7,290,278 B2 | 10/2007 | Cahill et al. | |
| 2005/0120219 A1* | 6/2005 | Munetoh et al. | 713/176 |
| 2005/0223217 A1 | 10/2005 | Howard | |
| 2005/0289341 A1 | 12/2005 | Ritola et al. | |
| 2006/0048216 A1 | 3/2006 | Hinton et al. | |
| 2006/0136990 A1 | 6/2006 | Hinton et al. | |
| 2006/0235761 A1 | 10/2006 | Johnson | |
| 2007/0192352 A1 | 8/2007 | Levy | |
| 2007/0204168 A1 | 8/2007 | Cameron | |
| 2008/0028000 A1 | 1/2008 | Makismenka et al. | |
| 2008/0028215 A1 | 1/2008 | Nanda et al. | |
| 2008/0046984 A1 | 2/2008 | Bohmer et al. | |
| 2008/0069102 A1 | 3/2008 | Koehler et al. | |

OTHER PUBLICATIONS

"WS-Federation 1.1 Completes the WS-* Security Stack," Author Unknown, Date Unknown, 6 pgs. [online] [retrieved on Apr. 15, 2008]. Retrieved from the Internet: http://identity-des.com/2007/05/02/ws-fed-completes-stack/.

"A Technical Reference for the Information Card Profile V1.0," by Arun Nanda, Microsoft Corporation, Dec. 2006, 54 pgs. [online] [retrieved on Apr. 15, 2008]. Retrieved from the Internet: http://msdn2.microsoft.com/en-us/library/bb298802.aspx#infocardprofile_topic5_2_1.

"Verified Implementations of the Information Card Federated Identity-Management Protocol," by Karthikeyan Bhargavan, Cedric Fournet, Andrew D. Gordon, and Nikhil Swamy, University of Maryland, College Park, Copyright ACM 2008, 14 pgs. [online] [retreived on Apr. 15, 2008]. Retrieved from the Internet: http://www.cs.umd.edu/~nswamy/papers/wcf-cardspace.pdf.

* cited by examiner

*Primary Examiner* — Hosuk Song
(74) *Attorney, Agent, or Firm* — Workman Nydegger

(57) ABSTRACT

A federated identity provisioning system includes relying parties, identity providers, and clients that obtain tokens from identity providers for access to a relying party's services. When a client contacts a new relying party, the relying party provides information that the client can independently resolve and evaluate for trustworthiness. For example, the relying party provides a generic domain name address. The client can then resolve the domain name address over various, authenticated steps to identity an endpoint for a digital identity provisioning service. The client can further interact with and authenticate the provisioning service (e.g., requiring digital signatures) to establish a trust relationship. Once determining that the client/user trusts the provisioning service, the client/user can then provide information to obtain a digital identity representation. The client can then use the digital identity representation with the corresponding identity provider to obtain one or more tokens that the relying party can validate.

17 Claims, 4 Drawing Sheets

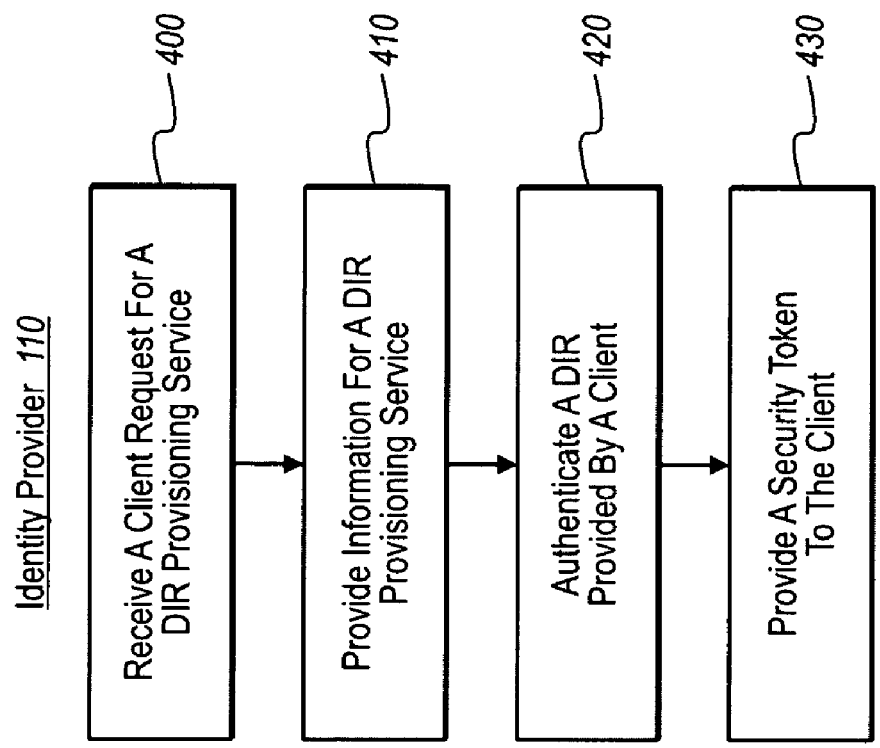
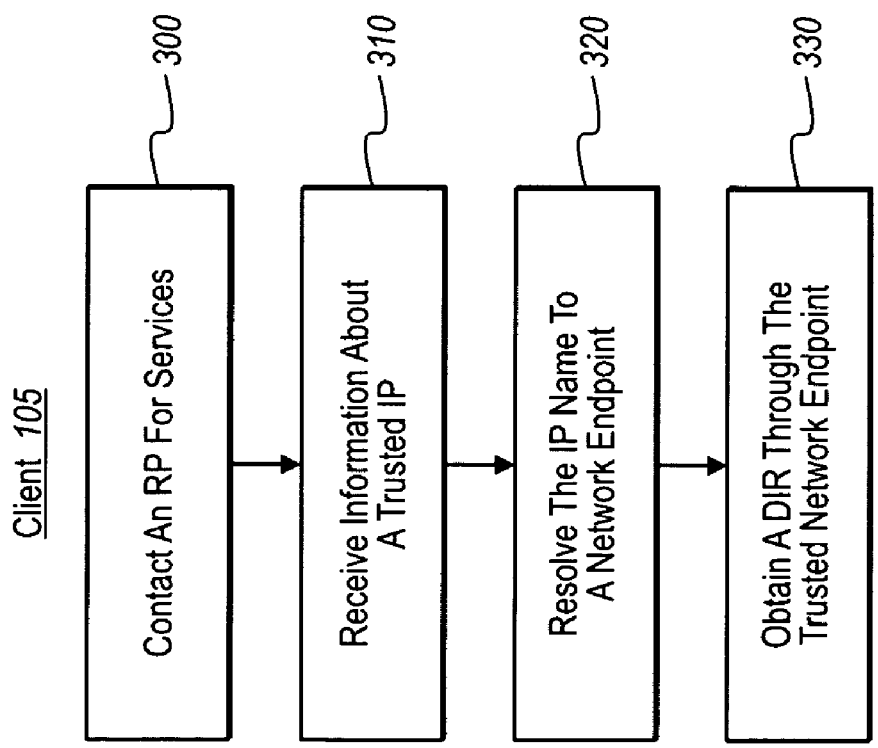

OBTAINING DIGITAL IDENTITIES OR TOKENS THROUGH INDEPENDENT ENDPOINT RESOLUTION

CROSS-REFERENCE TO RELATED APPLICATIONS

N/A

BACKGROUND

Background and Relevant Art

Conventional computer systems are now commonly used for a wide range of objectives, whether for productivity, entertainment, or the like. One reason for this is that computer systems tend to add efficiency with task automation, as well as making certain types of transactions more efficient. For example, some types of transactions in the past might have taken users hours or days to complete. In particular, if a user were to make a bank deposit, bank transfer, or even purchase items in a store, the user might have needed to physically travel to the bank or store location in order to verify the user's identity and present instructions for the transaction. Upon verifying the user's identity, the bank or store might then initiate and confirm the requested transaction. In this scenario, the bank or store could be considered a "relying party," which relies on the in-person identity provided by the user, who is an "identity provider."

More recently, however, automated (or computerized) mechanisms have reduced these types of transactions to seconds or minutes. In particular, transactions such as the above have become more and more efficient and complex due to the presence of automated terminals, which allow the user to execute transactions from remote locations. Rather than relying on in-person identity verification, however, automated terminals allow the user to satisfy a number of challenge and response scenarios before providing access to services. For example, the user might need to present an account card and personal identification number, which were previously received from the relying party when establishing a trust relationship between the user and relying party.

As with automated terminals, more recent internet-based relying parties also request that the end-user establish a trust relationship of some sort, often through requiring the user to provide some verifiable personal information (e.g., name, address, birthday, etc.) The relying party might also require the user to present other third-party verification information, such as credit card information, driver's license information, or social security card information. In these types of cases, the relying party relies not only on the user's self-verification information, but also on verification by other parties (e.g., credit card company, or governmental entity) with which the relying party has already established a trust relationship. The relying party can thus require the user to present some or all of the personal and third-party information previously exchanged when the user subsequently accesses the relying party's services.

Due to the efficiency gains usually provided through online transactions, a growing number of entities are providing services this way, and users are increasingly demanding use of the same. This growth in online transactions, however, has generated another set of problems. That is, users often now have a large and growing number of different online accounts that they need to track and maintain. Particularly in the case where the user provides different verification information to each different relying party, the user may need to remember or have access to a growing number of different usernames, passwords, and potentially other verification information.

Some conventional mechanisms attempt to mitigate some of these concerns by implementing "federated" identity verification systems. In federated systems, a separate identity provider maintains data that can be used to generate one or more security tokens for many of a user's different accounts at various relying parties. In general, a "security token" is the means by which an identity provider asserts a user's identity to a relying party. So that the security tokens are portable across many different relying parties, this type of identity provider will need to establish a trust relationship with each of the different relying parties for which the user would like access.

Thus, when the user desires access to a particular service at a relying party, the user can contact the identity provider, verify himself to the identity provider, and obtain a token from the identity provider. The user can then present the token from the identity provider, which contains some claims about the user and/or user's client system (and some information about the identity provider), to the relying party. Since the relying party trusts the identity provider and the user, the relying party can use the provided information to validate the token, and, if validated, provide the user with access to variously requested services or transactions.

Since some relying parties may only trust certain identity providers, or may only have trust relationships established with certain identity providers, the user may also have established accounts with multiple different identity providers. In conventional systems, the user maintains or stores one or more digital identity representations that can be used at each identity provider to obtain the security token. An identity selection service stored at the user's client computer system, in turn, can manage and identify what identity representations should be used for any given identity provider.

For example, a user might need to use one digital identity representation with one particular identity provider to issue tokens for one particular relying party. The user might then use another digital identity representation at the same (or different) identity provider for still other tokens at the relying party (or at another relying party). The identity selection service thus provides the appropriate one or more digital identity representations to the appropriate identity provider (s).

In general, the above-described federation system tends to work well when the user already has an established trust relationship with the required identity providers. In some cases, however, the user may encounter a relying party who will accept tokens from an identity provider with which the user (or client system) has not established a trust relationship. Although the user can go through the process of establishing a relationship with a particular identity provider, the user still needs to be able to identify the name and location of the identity provider. Providing the information about the identity provider's name and location, however, can involve a number of security risks.

For example, if the above scenario were established so that a relying party automatically directs a client system to a particular identity provider, the user could be at risk for a "phishing" attack. In particular, a malicious relying party that the user believes is legitimate may automatically direct the user to a malicious identity provider. When the user attempts to establish an identity representation with the malicious identity provider, the identity provider could simply steal the user's identity and take advantage of the user. The identity provider could even provide a token for access to the malicious relying party, and thus maintain appearances for an extended period of time.

Even for legitimate relying parties, there can be some risk to the user (and/or to the relying party) when the relying party provides the exact endpoint for digital identity representation provisioning services. One will appreciate that such problems will only tend to increase as more and more entities move toward providing secure online transactional services. Accordingly, there are a number of difficulties with federated systems that can be addressed.

BRIEF SUMMARY

Implementations of the present invention overcome one or more problems in the art with systems, methods, and computer program products configured to provide independent user/client verification of digital identity representation provisioning services before obtaining tokens for use with a relying party. In at least one implementation, for example, in response to a request for services at a relying party, a client receives metadata about one or more identity providers trusted by the relying party. The client then independently resolves the metadata to identify a digital identity provisioning service offered by the identity provider, and to determine if the client can trust the provisioning service. If trusted, the client can then establish a digital identity representation with the corresponding identity provider through that provisioning service, and obtain one or more tokens for use with the relying party.

For example, a method from the perspective of a client computer system of obtaining digital identity representations and/or security tokens can involve contacting a relying party to access one or more services at the relying party. The method can also involve receiving one or more policy files from the relying party. In this case, the one or more policy files comprise information that identifies a generalized name corresponding to a set of one or more trusted identity providers. In addition, the method can involve automatically resolving the identified generalized name to obtain one or more network endpoints for one of the trusted identity providers. Furthermore, the method can involve, upon authenticating the one or more network endpoints, contacting the one resolved identity provider to obtain one or more digital identity representations for use in obtaining one or more security tokens.

In addition, a method from the perspective of an identity provider providing one or more digital identity representations and/or one or more security tokens to a client can involve receiving at an identity provider one or more requests from a client for one or more digital identity representation provisioning services. The method can also involve providing to the client information that identifies one or more digital identity provisioning services offered by the identity provider. In addition, the method can involve authenticating one or more digital identity representations received from the client. In this case, the identity provider determines that the received one or more digital identity representations are valid. Furthermore, the method can involve providing one or more security tokens corresponding to the authenticated one or more digital identity representations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flow chart of one or more acts in a method from the perspective of a client for obtaining a digital identity representation from a trusted endpoint; and FIG. 4 illustrates a flow chart of a method from the perspective of an identity provider for providing a token to a client upon authenticating a newly-provided digital identity representation.

DETAILED DESCRIPTION

Implementations of the present invention extend to systems, methods, and computer program products configured to provide independent user/client verification of digital identity representation provisioning services before obtaining tokens for use with a relying party. In at least one implementation, for example, in response to a request for services at a relying party, a client receives metadata about one or more identity providers trusted by the relying party. The client then independently resolves the metadata to identify a digital identity provisioning service offered by the identity provider, and to determine if the client can trust the provisioning service. If trusted, the client can then establish a digital identity representation with the corresponding identity provider through that provisioning service, and obtain one or more tokens for use with the relying party.

Accordingly, and as will be understood more fully herein, implementations of the present invention provide one or more mechanisms by which an identity provider can publish the location of services that can issue digital identity representations (or DIR, also referred to as "information cards"). Implementations of the present invention also provide one or more mechanisms by which an identity provider can publish alternative information, which allows a user to establish a relationship with the identity provider before obtaining a DIR. In addition, implementations of the present invention provide one or more mechanisms by which an identity selector (e.g., a component or application on the client system) can find out if DIRs for a particular identity provider are available, and present the information to users to help them obtain their DIRs.

In general, these and other aspects of the present invention can be accomplished in at least one implementation using metadata elements configured in accordance with the WS-FEDERATION specification. In at least one implementation, for example, an identity provider and relying party can both direct users to various endpoints using various metadata elements that the user can use to independently verify the particular endpoints. For example, certain metadata elements can describe the actual location of the DIR issuing service where a client needs to go to obtain the card. Certain metadata elements can also describe the security requirements for issuing a card. In addition, the metadata elements can indicate to a user where to go in case the user does not have a relationship with the issuer/identity provider in the case such a relationship is required before downloading a digital identity representation (i.e., DIR). These metadata elements, in turn, allow a user's client identity selector, in conjunction with one or more additional components described herein, to find or establish an DIR that the user needs, and then obtain the relevant security token(s).

Figure 1A:
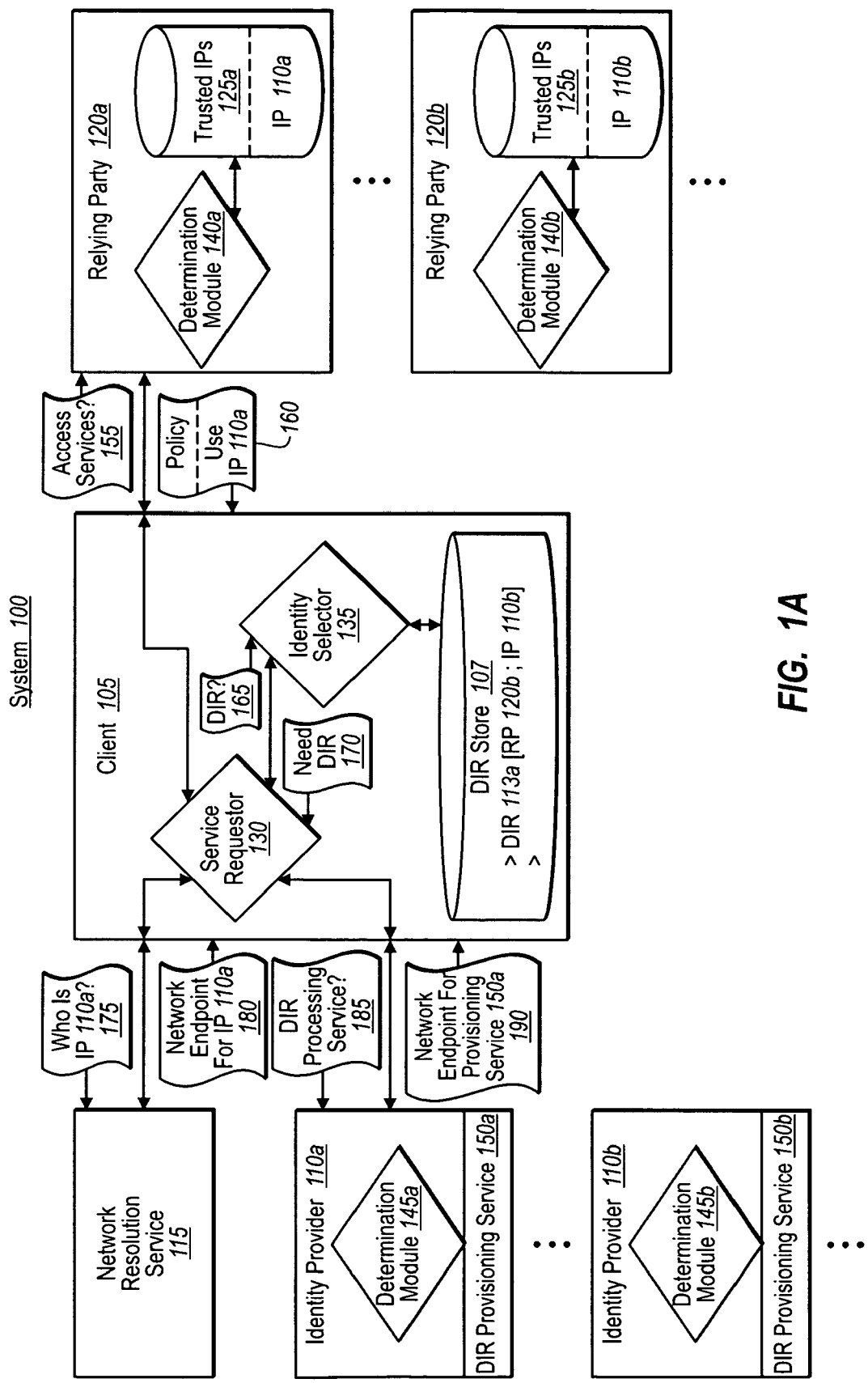
FIG. 1A illustrates an overview schematic diagram of a federated identity system in which a client resolves one or more policies from a relying party to identify an appropriate identity provider.

FIG. 1A illustrates a federated identity provisioning system 100 in accordance with an implementation of the present invention. As shown, a federated identity provisioning system 100 comprises at least a client 105, and one or more relying parties 120(a, b, etc.) for which the client 105 (i.e., on behalf of a user) requests access to particular services. For example, the relying party 120 is an online bank or an online store that provides various account or purchasing functions. FIG. 1A also shows that each relying party 120(a, b, etc.) comprises a determination module 140(a, b, etc.) and a list 125(a, b, etc.) of trusted identity providers. Each of these modules and lists are discussed more fully below.

In addition, FIG. 1A shows that the federated identity provisioning system 100 comprises one or more identity providers 110(a, b, etc.), which each also have their own determination modules 145(a, b, etc.) and corresponding one or more digital identity provisioning services 150(a, b, etc.) As understood more fully herein, the one or more identity providers 110 verify the identity of a user/client to a relying party with one or more "security tokens" (e.g., 210, FIG. 2). In general, a security token provides various claims about a user in a format/configuration that is mutually agreed upon by a relying party 120 and trusted identity provider 110. For example, a relying party 120 in the form of a bank or online store requires independent verification of user/client 105 credentials before providing the requested services to the client 105; a trusted identity provider 110, in turn, provides this verification through one or more security tokens, which comprise expected data used to verify the user's credentials.

The client 105 cannot, however, simply request a security token from an indicated identity provider 110. Rather, the client 105 will need to establish a relationship of trust with the identity provider 110. Furthermore, the client 105 cannot simply gain a relationship of trust with any given identity provider 110 for purposes of interacting with any particular relying party 120. Rather, the client 105 needs to obtain a relationship of trust with a particular identity provider 110 that is also trusted by the particular relying party 120 for which the client requests services. That is, not every relying party 120 will have a trust relationship with every identity provider 110, and vice versa. For example, FIG. 1A shows that relying party 120a maintains a list 125a of trusted identity providers 100, which includes in this case identity provider 110a, but not identity provider 110b. Similarly, FIG. 1A shows that relying party 120b maintains a list 125b of trusted identity providers 100, which includes in this case identity provider 110b, but not identity provider 110a.

In general, the client's (on behalf of the user) relationship of trust with a given identity provider is manifest in the aforementioned digital identity representation, or DIR (113). The client, in turn, uses a particular DIR 113(a, b, etc.) in order to obtain a security token with a particular identity provider 110, ultimately for use with services at one or more relying parties that trust the particular identity provider. Thus, for example, FIG. 1A shows that client 105 maintains a DIR store 107, which includes in this case a DIR 113a for identity provider 110b, which is used for services with relying party 120b since only relying party 120b, and not relying party 120a, trusts identity provider 110a. Accordingly, one will appreciate that any given DIR 113 may be used with multiple different relying parties 120.

In addition, although the client 105 can maintain any number of DIRs 113 in store 107, FIG. 1A shows that client 105 only has a single DIR 113a for purposes of simplicity. In this example, the illustrated DIR 113a allows client 105 to obtain security tokens from identity provider 110b for use with relying party 120b. By contrast, FIG. 1A also illustrates that client 105 does not have a DIR corresponding to an identity provider 110a, and/or for use with services at relying party 120a.

Accordingly, as shown in FIG. 1A, when client 105 attempts (e.g., message 155) to access services with relying party 120a, relying party 120a ultimately directs client 105 to an identity provider (i.e., 110a) for which the client 105 has not yet established a relationship (i.e., there is no DIR 113). For example, FIG. 1A shows that, in response to message 155, relying party 120a (e.g., via determination module 140a) determines that client 105 still needs to present a security token to access services. Thus, FIG. 1A shows that relying party 120a responds with one or more policies 160.

One will appreciate that relying party 120a can provide the one or more policies 160 any number of ways. For example, relying party 120a can publish one or more documents that contain the information about appropriate token issuers (i.e., identity providers). The client 105 can then review the published document for the relevant information. In additional or alternative implementations, the relying party 120a responds with the specific information regarding the name of the trusted identity providers 110.

The information/policies 160 provided by relying party 120a in turn, can comprise any number or types of information. As previously mentioned, for example, the policies 160 can comprise various metadata elements (e.g., in accordance with the WS-FEDERATION specification) regarding a network endpoint for a particular identity provider 110. In additional or alternative implementations, the one or more metadata elements comprise or otherwise indicate one or more generalized domain names, which client 105 will need to resolve further in order to determine the appropriate endpoint. For example, the one or more policies 160 can comprise information such as "use an identity provider from BANK.com". In such a case, client 105 would need to resolve BANK.com to identify one or more identity providers 110, and obtain a security token therefrom.

Accordingly, FIG. 1A shows that client 105 processes the information 160 about the appropriate identity provider(s) 110 via service requester 130, which compares the received information 160 through an identity selector 135. Specifically, FIG. 1A shows that service requester 130 sends one or more messages 165 to identity selector 135 to inquire whether there is a DIR (i.e., in store 107) corresponding to identity provider 110*a* for relying party 120*a*. In this case, FIG. 1A shows that identity selector 135 responds with one or more messages 170 indicating that there is no such DIR, or otherwise indicating the need to establish a DIR for identity provider 110*a*. In additional or alternative implementations, identity selector 135 further presents one or more interfaces to the user, and allows the user to select an appropriate DIR 113 for use with relying party 120*a*, or otherwise an option to go obtain a new DIR 113 if needed.

In the illustrated case, FIG. 1A shows that service requester 130 is instructed to find (and communicate with) identity provider 110*a* to obtain an appropriate DIR 113. FIG. 1A also shows that the information 160 regarding identity provider 110*a* needs further resolution, since it does not represent a precise network endpoint. Accordingly, FIG. 1A shows that service requester 130 contacts one or more domain name resolution services 115 with one or more messages 175. In additional or alternative implementations, service requester 130 contacts one or more other agents or services, which, in turn, contact network resolution service 115 with message 175. In either case, FIG. 1A shows that client 105 ultimately receives one or more messages 180 with the resolved information 180, which includes in this case, a specific network endpoint for identity provider 110*a*.

Of course, one will appreciate that network resolution service 115 could additionally or alternatively respond with one or more other domain names for other services or agents. Such a response could require service requester 130 to still further contact other entities to obtain additional information/resolutions before obtaining an endpoint corresponding to identity provider 110*a*. For example, response 180 could include a list of identity providers that could potentially correspond with the name for identity provider 110*a*. Service requester 130 could then contact any or all of the identified identity providers in the list on a continuing basis until identifying the appropriate and specific network endpoint for the identity provider 110*a* indicated by relying party 120*a*. However conducted, it is notable that client 105 (e.g., on behalf of the user) independently determines or resolves network endpoints without specific direction from relying party 120*a*.

In any event, upon receiving the endpoint via message 180, FIG. 1A shows that service requester 130 sends one or more messages 185 to identity provider 110*a* (i.e., the resolved endpoint corresponding thereto) in order to obtain information about its DIR provisioning service. If client 105 had a previously-established relationship of trust, and already had an appropriate DIR 113, client 105 could then use that DIR (e.g., via message 200, FIG. 2) to request an appropriate security token (210, FIG. 2) for relying party 120*a*. Since, in this case, client 105 does not have a DIR for identity provider 110*a*, client 105 thus asks for the location of an appropriate DIR provisioning service.

In response, FIG. 1A shows that identity provider 110*a* sends one or more messages 190, which generally identify a digital identity representation provisioning service 150*a* (i.e., "DIR Provisioning Service"). As with policies 160, the one or more messages 190 can also comprise a published document comprising metadata elements having one or more specific network endpoints. In additional or alternative implementations, however, the information in message 190 can comprise resolvable domain names, which service requester 130 must resolve (e.g., via resolution service 115) in one or more additional steps to identify a network endpoint for the DIR provisioning service 150. In either case, and upon identifying the correct network endpoints for the DIR provisioning service 150 (i.e., 150*a*), client 105 then attempts to obtain a DIR 113.

Figure 1B:
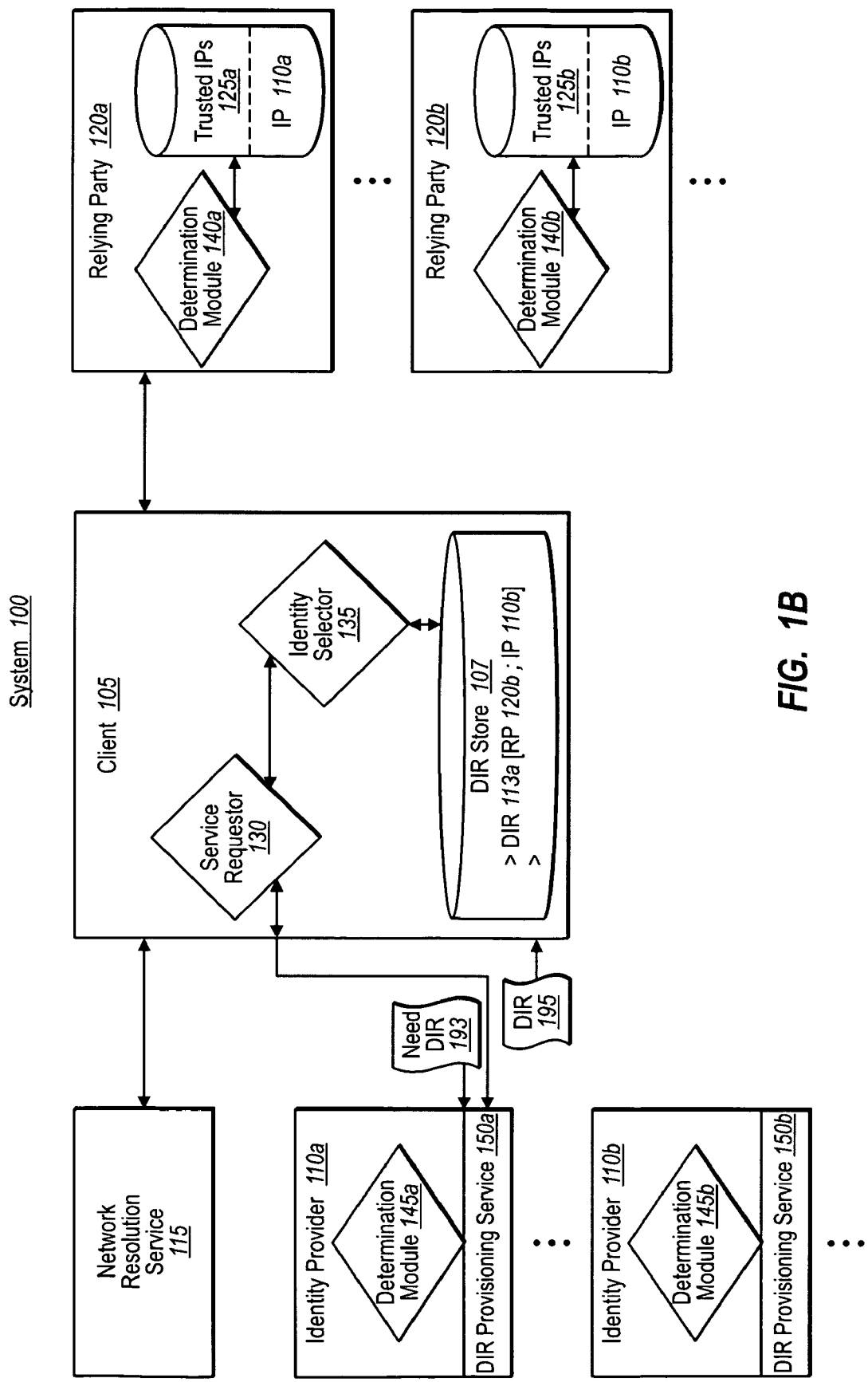
FIG. 1B illustrates an overview schematic diagram in which a client contacts a digital identity representation provisioning service referred to by the identity provider, and uses the service to obtain a digital identity representation.

For example, FIG. 1B shows that service requester 130 sends one or more messages 193 to the identified digital identity provisioning service 150*a*, requesting one or more DIRs 113 for use with a relying party, such as relying party 120*a*. In general, this can include not only a general request to initiate/create a DIR 113, but also a series of requests and responses (i.e., multiple different messages) in order to establish and obtain the DIR 113. For example, DIR provisioning service 150*a* may request personal information about a user (through client 105), and the user, via client 105 may need to provide several corresponding responses. Such requests can include information regarding credit card information, driver's license information, social security card information, and other challenge-based information that can be used to personally identify the user in some way. Upon validating the user's information/credentials (provided by service requester 130), DIR provisioning service 150*a* can then respond with an appropriate DIR 113. For example, FIG. 1B shows that DIR provisioning service 150*a* sends to client 105 one or more messages 195 regarding a newly created DIR 113*b* pertaining to identity provider 110*a*, which, in this case, client can use with relying party 120*a*.

Figure 2:
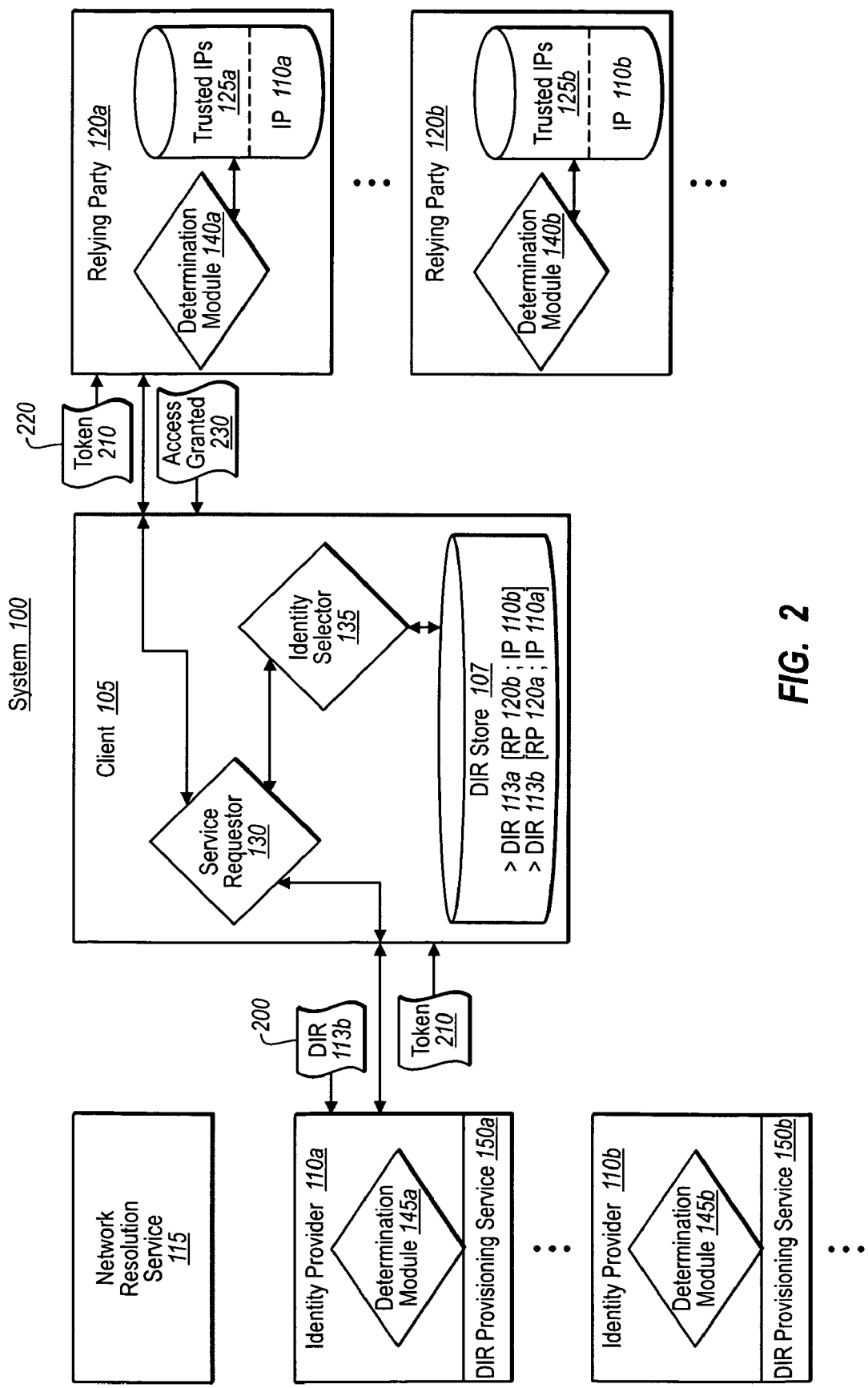
FIG. 2 illustrates a schematic of the system shown in FIGS. 1A and 1B, in which the client uses the digital identity representation provided by the provisioning service in FIG. 1B to obtain a token that the client then uses to access services at a relying party.

As shown in FIG. 2, client 105 stores this new DIR 113*b* in its DIR store 107. In addition, client 105 can then use the new DIR 113*b* to obtain one or more security tokens 210 in order to access services with relying party 120*a*. As shown in FIG. 2, for example, client 105 (i.e., via service requester 130) sends one or more new messages 200 to identity provider 110*a*. In this case, the one or more messages 200 include information corresponding to the newly created DIR 113*b*, as well as a request for one or more security tokens to access services at relying party 120*a*.

In response, determination module 150*a* at identity provider 110*a* then validates the provided DIR 113*b*. For example, determination module 145*a* at identity provider 110*a* determines that the new DIR 113*b* corresponds to (or was created by) a DIR provisioning service 150 that was based on the one or more metadata elements in messages 190. As such, since the DIR 113*b* has been authenticated or validated, FIG. 2 shows that identity provider 110*a* responds with one or more corresponding security tokens 210. Specifically, FIG. 2 shows that identity provider 110*a* sends the one or more security tokens 210 directly to client 105, whereupon client 105 provides the one or more security tokens 210 in one or more corresponding messages 220 to relying party 120*a*. Of course, one will appreciate that identity provider 110*a* may additionally or alternatively send the one or more security tokens 210 directly to relying party 120*a*.

In addition, FIG. 2 shows that relying party 120*a* processes the security token 210 received in the one or more messages 220 through determination module 140. For example, determination module 140*a* processes the security token 210 to determine if it conforms to the one or more data elements of in the previously-provided information 160 (FIG. 1). In one implementation, this includes the relying party 120*a* determining that the received security token 210 is from a trusted identity provider (e.g., 110*a*), and that the security token 210 includes expected data for verifying the user that is requesting services. Upon identifying that the security token 210 is valid, and/or (in conjunction with the security token 210) that the user information provided by client 105 is verified, relying party 120a can then grant access to the requested services. For example, FIG. 2 shows that relying party 120a sends one or more messages 230 back to client 105, which allow client 105 to access the requested services.

Accordingly, FIGS. 1A through 2 provide one or more mechanisms for enabling a secure resolution of information by a client 105. Specifically, FIGS. 1A through 2, and the corresponding text, provide a number of components and mechanisms for ensuring that a client 105 can safely and securely obtain a trust relationship with an identity provider. In at least one implementation, such components and mechanisms involve a level of independent resolution and action by a client, which can avoid a number of security breaches, such as those associated, for example, with conventional phishing attacks.

In addition to the foregoing, implementations of the present invention can also be described in terms of methods comprising one or more acts for accomplishing a particular result. For example, FIG. 3 illustrates a flow chart from the perspective of client 105 for resolving information from a relying party to obtain a digital identity representation from a trusted endpoint, such as identity provider 110. In addition, FIG. 4 illustrates a flow chart from the perspective of an identity provider 110 for authenticating a digital identity representation and providing a corresponding security token to a client. The acts of FIGS. 3 and 4 are described more fully below with respect to the components and diagrams 1A, 1B and 2.

For example, FIG. 3 illustrates that a method from the perspective of client 105 can comprise an act 300 of contacting a relying party (RP) for services. Act 300 includes contacting a relying party to access one or more services at the relying party. For example, FIG. 1A shows that client 105 sends one or more messages 155 to relying party 120a, which request access to one or more services at relying party 120a.

FIG. 3 also shows that the method from the perspective of client 105 can comprise an act 310 of receiving information about a trusted identity provider (IP). Act 310 includes receiving one or more policy files from the relying party, wherein the one or more policy files comprise information that identifies a generalized name corresponding to a set of one or more trusted identity providers. For example, FIG. 1A shows that, since client 105 does not have an established relationship with relying party 120, relying party sends one or more messages 160 back to client 105. In this particular case, the one or more messages 160 include information indicating generalized information about trusted identity provider 110a. As understood more fully herein, such information 160 could include a specific network endpoint for identity provider 110a. Of course, such information 160 can also or alternatively include a generalized domain name of the identity provider 110a, or to yet another service 110a that can be contacted to identity the network address for identity provider 110a.

In addition, FIG. 3 illustrates that a method from the perspective of client 105 can comprise an act 320 of resolving the identity provider name to a trusted network endpoint. Act 320 includes automatically resolving the generalized name to obtain one or more network endpoints for one of the trusted identity providers. For example, service requester 130 at client 105 automatically sends one or more messages 175 to a network resolution service 115 and requests resolution of a generalized domain name found in information 160. In turn, service requester 130 receives one or more messages 180 that resolve the initially-provided generalized name corresponding to identity provider 110a to one or more particular network endpoints. Alternatively, service requester 130 automatically contacts a specific network endpoint found in information 160, and asks the entity at the network endpoint to provide the location of an appropriate identity provider 110.

Furthermore, FIG. 3 shows that the method from the perspective of client 105 can comprise an act 330 of obtaining a digital identity representation through the trusted network endpoint. Act 330 includes, upon authenticating the one or more network endpoints, contacting the one resolved identity provider to obtain one or more digital identity representations for use in obtaining one or more security tokens. For example, FIGS. 1A and 1B show that identity provider 110a sends one or more messages 190 back to client 105. The one or more messages 190, in turn, can comprise one or more metadata elements (e.g., in accordance with the WS-FEDERATION standard) that indicate one or more endpoints for the DIR provisioning service (e.g., 150a). Similarly, the one or more messages 190 can comprise one or more metadata elements that need to be resolved further to one or more endpoints corresponding to the DIR provisioning service (e.g., 150a). In either case, service requester 130 then uses that information in messages 190 to ultimately contact the appropriate DIR provisioning service (e.g., 150a), and obtain a digital identity representation (e.g., 113b).

In addition to the foregoing, FIG. 4 shows that a method from the perspective of an identity provider 110 can comprise an act 400 of receiving a client request for information about DIR provisioning services. Act 400 includes receiving at an identity provider one or more requests from a client for one or more DIR provisioning services that for establishing one or more DIRs that can be subsequently used to obtain one or more security tokens that can verify a user to a relying party. As previously discussed, for example, FIG. 1A shows that identity provider 110a receives one or more requests 185 for DIR provisioning service information from client 105, as part of an effort to eventually obtain one or more security tokens.

FIG. 4 also illustrates that the method from the perspective of identity provider 110 can also comprise an act 410 of providing information for a digital identity representation provisioning service. Act 410 includes providing to the client information that identifies one or more digital identity provisioning services trusted by the identity provider. For example, as previously mentioned, FIG. 1A shows that, in response to a request 185, identity provider 110a provides information via one or more messages 190. In at least one implementation, the one or more messages 190 comprise a published security document, or at least a portion of the information contained therein. Such information can include domain names for the DIR provisioning service 150a (which may need further resolution via network resolution service 115), or simply the specific network endpoints for service 150a.

In addition, FIG. 4 shows that the method from the perspective of identity provider 110 comprises an act 420 of authenticating a digital identity representation provided by a client. Act 420 includes authenticating one or more digital identity representations received from the client, wherein the identity provider determines that the received one or more digital identity representations are valid. For example, as shown in FIG. 2, identity provider 110a (e.g., via determination module 145a) evaluates DIR 113b provided by client 105 in message 200. Specifically, identity provider 110a determines that DIR 113b was created and provided by the DIR provisioning service 150a previously referred to in the one or more messages 190. As such, identity provider 110a confirms that client 105 that provided DIR 113b via message 200 is the same client 105 that requested the DIR provisioning information via message 185.

Furthermore, FIG. 4 shows that the method from the perspective of identity provider 110 can comprise an act 430 of providing a security token to the client. Act 430 includes providing one or more security tokens corresponding to the authenticated one or more digital identity representations. For example, FIG. 2 shows that, upon validating the digital identity representation 113b in message 200, identity provider 110a sends one or more security tokens 210 back to client 105. Client 105 can then use the provided security tokens 210 to verify the requesting user's identity with relying party 120a.

Accordingly, implementations of the present invention provide a number of different components and mechanisms for safely, securely, and efficiently providing clients with access to appropriate security tokens. As discussed herein, for example, such mechanisms can include means by which a client's identity selector to determine if DIRs for a particular identity provider are available, and, if not, a way to help the users obtain an appropriate DIR. Such mechanisms can also enable identity providers to provide (e.g., via publications or otherwise) various metadata elements to the users, where the metadata elements indicate the location of DIR provisioning services that can issue appropriate DIRs. As previously mentioned herein, such information (e.g., in the form of metadata elements) can be published in such a way as to enable independent resolution by a client of the various endpoints, thus enhancing security in the overall federated system.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer in a federated computerized system having the client, one or more identity providers, and one or more relying parties, a method of the client independently resolving the location of an identity provider pursuant to obtaining security tokens that can be used by the client to access one or more services at a relying party, comprising the acts of:

the client computer contacting a relying party to access one or more services at the relying party;

the client computer receiving one or more policy files from the relying party, wherein the one or more policy files comprise information that identifies a generalized name corresponding to a set of one or more trusted identity providers;

the client computer automatically resolving the identified generalized name to obtain one or more network endpoints for one of the trusted identity providers;

upon authenticating the one or more network endpoints, the client computer contacting the one resolved identity provider to obtain one or more digital identity representations for use in obtaining one or more security tokens and in response to the client computer at least sending one or more requests to the resolved identity provider to obtain information about any available digital identity representation provisioning service and the client computer receiving one or more messages comprising information about a digital identity representation provisioning service used with the resolved identity provider.

2. The method as recited in claim 1, wherein the generalized name comprises a network endpoint for the one trusted identity provider.

3. The method as recited in claim 1, wherein the generalized name comprises a domain name corresponding to the one trusted identity provider.

4. The method as recited in claim 3, wherein the act automatically resolving the identified generalized name further comprises an act of sending one or more requests to a resolution service.

5. The method as recited in claim 1, further comprising, wherein one or both of the information in the one or more policy files, and the information received in the one or more messages from the identity provider comprise one or more metadata elements.

6. The method as recited in claim 1, further comprising an act of sending one or more additional messages to the resolution service, wherein the one or more additional messages request resolution of the information received in the one or more messages from the resolved identity provider.

7. The method as recited in claim 1, further comprising the acts of:

identifying a network endpoint corresponding to the digital identity representation provisioning service; and the client sending one or more messages to the digital identity representation provisioning service to obtain a digital identity representation.

8. The method as recited in claim 7, further comprising an act of receiving one or more digital identity representations from the provisioning service for use with the resolved identity provider.

9. The method as recited in claim 8, further comprising the acts of:

the client sending one or more additional messages to the resolved identity provider comprising information corresponding to the received digital identity representations; and receiving one or more messages from the resolved identity provider comprising the one or more security tokens.

10. The method as recited in claim 9, further comprising the acts of:

the client sending one or more messages to the relying party that include the one or more tokens received from the identity provider; and receiving one or more responses from the relying party that indicate that access to the one or more services has been granted.

11. At an identity provider in a federated computerized system having the identity provider, one or more clients, and one or more relying parties, a method of providing one or more digital identity representations and one or more security tokens to a client that resolves infoiniation provided by a relying party, comprising the acts of:

receiving at an identity provider one or more requests from a client for one or more digital identity representation provisioning services for establishing one or more DIRs that can be subsequently used to obtain one or more security tokens that will be used by the client to verify a user of the client to a relying party;

providing, to the client, information that identifies at least one digital identity provisioning service trusted by the identity provider, the information comprising one or more generalized names corresponding to the one or more digital identity provisioning services that need to be resolved to one or more network endpoints before the client can access the digital identity provisioning service;

authenticating one or more digital identity representations received from the client, wherein the identity provider determines that the received one or more digital identity representations are valid; and providing one or more security tokens corresponding to the authenticated one or more digital identity representations.

12. The method as recited in claim 11, wherein the act of providing the client information further comprises:

publishing one or more documents comprising the information that identifies the one or more digital identity provisioning services; and digitally signing the one or more documents.

13. The method as recited in claim 11, wherein the provided information in the published one or more documents comprise one or more metadata elements.

14. The method as recited in claim 11, wherein the information provided to the client comprises one or more network endpoints corresponding to the trusted one or more digital identity provisioning services.

15. The method as recited in claim 11, wherein the act of authenticating the one or more digital identity representations further comprises:

receiving at the identity provider one or more new requests from the client for the one or more security tokens for use with the relying party; and identifying one or more valid digital identity representations in the one or more new requests.

16. The method as recited in claim 15, wherein the act of authenticating the one or more digital identity representations further comprises determining that the received one or more digital identity representations were obtained from one of the trusted digital identity provisioning services.

17. At a client computer in a federated computerized system having the client, one or more identity providers, and one or more relying parties, a computer program product having computer executable instructions stored thereon that, when executed, cause one or more processors at the client computer to perform a method comprising:

the client computer contacting a relying party to access one or more services at the relying party;

the client computer receiving one or more policy files from the relying party, wherein the one or more policy files comprise information that identifies a generalized name corresponding to a set of one or more trusted identity providers;

the client computer automatically resolving the identified generalized name to obtain one or more network endpoints for one of the trusted identity providers;

upon authenticating the one or more network endpoints, the client computer contacting the one resolved identity provider to obtain one or more digital identity representations for use in obtaining one or more security tokens and in response to the client computer sending one or more requests to the resolved identity provider to obtain information about any available digital identity representation provisioning service and the client computer receiving one or more messages comprising information about a digital identity representation provisioning service used with the resolved identity provider.

* * * * *

UNITED STATES PATENT AND TRADEMARK OFFICE
CERTIFICATE OF CORRECTION

PATENT NO. : 8,074,258 B2  Page 1 of 1
APPLICATION NO. : 12/141515
DATED : December 6, 2011
INVENTOR(S) : Arun K. Nanda et al.

It is certified that error appears in the above-identified patent and that said Letters Patent is hereby corrected as shown below:

In column 13, line 20, in Claim 11, delete "infoiniation" and insert -- information --, therefor.

Signed and Sealed this
Thirty-first Day of January, 2012

David J. Kappos
*Director of the United States Patent and Trademark Office*